May 6, 1958 R. OLLEO, JR 2,833,907
GUARD FOR PROTECTING COOKING VESSELS FROM THE HIGHER
TEMPERATURES OF ELECTRIC RANGES
Filed Oct. 9, 1953 3 Sheets-Sheet 1
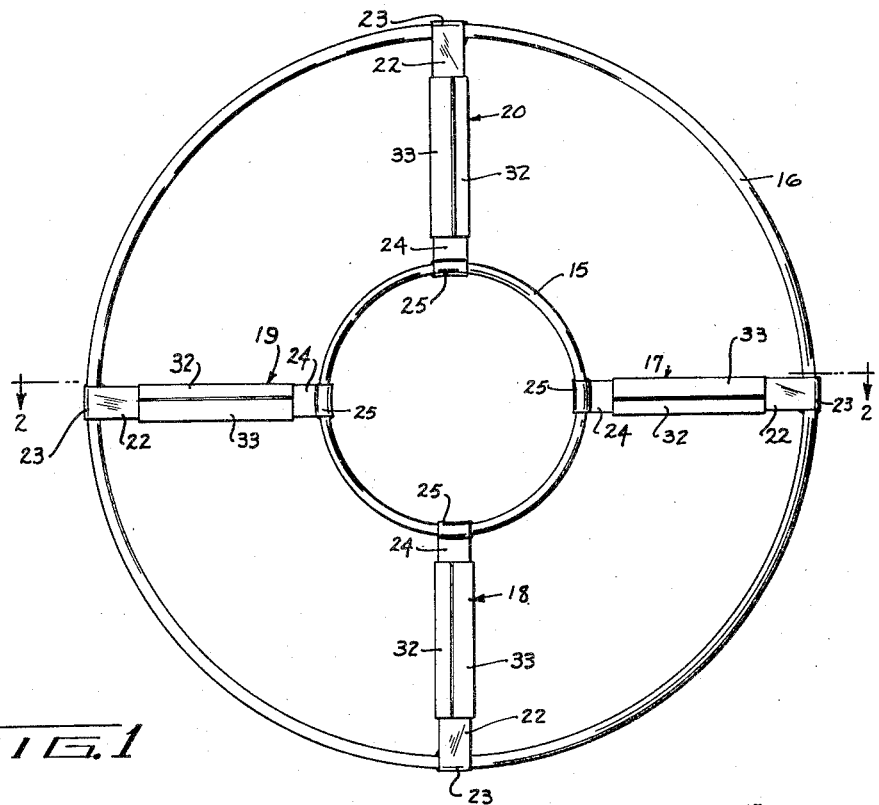
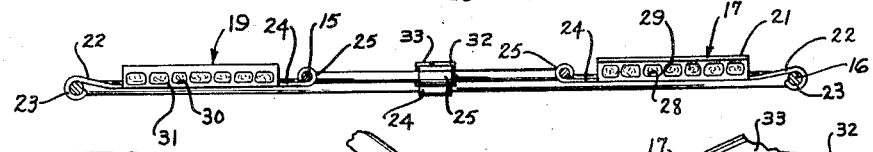
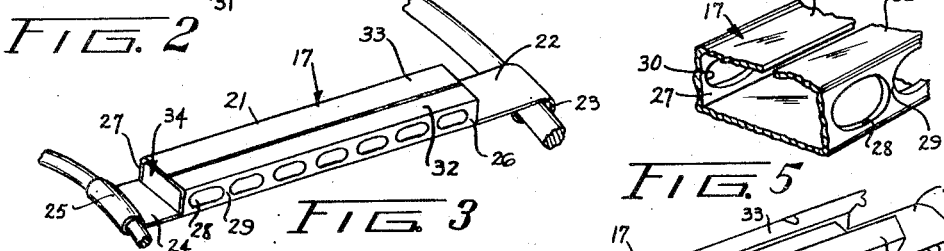
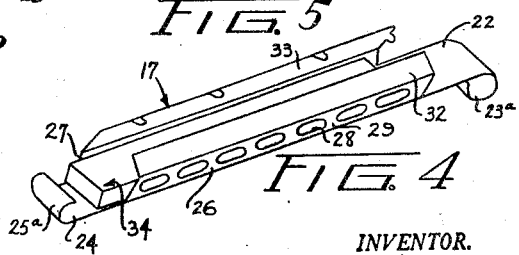
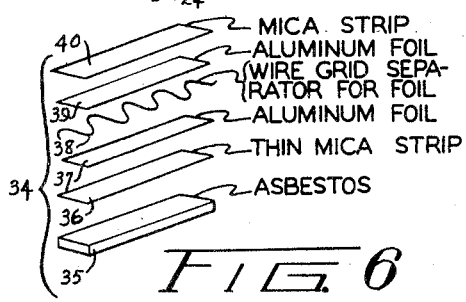
INVENTOR.
RALPH OLLEO, JR.
BY
ATTORNEY May 6, 1958 R. OLLEO, JR 2,833,907
GUARD FOR PROTECTING COOKING VESSELS FROM THE HIGHER
TEMPERATURES OF ELECTRIC RANGES
Filed Oct. 9, 1953 3 Sheets-Sheet 2

INVENTOR.
RALPH OLLEO, JR.
BY

ATTORNEY

May 6, 1958 R. OLLEO, JR 2,833,907
GUARD FOR PROTECTING COOKING VESSELS FROM THE HIGHER
TEMPERATURES OF ELECTRIC RANGES
Filed Oct. 9, 1953 3 Sheets-Sheet 3

INVENTOR.
RALPH OLLEO, JR.
BY J. A. Grier
ATTORNEY

United States Patent Office 2,833,907
Patented May 6, 1958

2,833,907

GUARD FOR PROTECTING COOKING VESSELS FROM THE HIGHER TEMPERATURES OF ELECTRIC RANGES

Ralph Olleo, Jr., Glen Cove, N. Y.

Application October 9, 1953, Serial No. 385,116

5 Claims. (Cl. 219—37)

This invention relates to improvements in guards for glass and ceramic cooking vessels to protect them against breakage due to the heat encountered when the same are used on modern electric ranges.

One object of the invention is the provision, of a guard of the character described, comprising a support for a vessel of glass of the like adapted to be placed on the surface unit of a modern electric range so that the vessel will receive substantially less heat by conduction than it would if it were in physical contact with the coils of the surface unit.

The term surface unit is generally applied to the heating elements on modern electric ranges.

Another object of the invention is the provision of a guard for vessels made of glass or the like comprised of a plurality of arms formed of metal and having sections thereof in which the conductivity of said metal has been substantially reduced.

A further object of the invention is the provision in combination with an electrical burner or surface unit, having a plurality of convolutions, of a vessel support including a plurality of projections which extend between said convolutions to support said vessel.

Another object of the invention is the provision in combination with an electrical burner or surface unit, having a plurality of convolutions, of a member, generally in the form of a cross, each arm of said cross having a plurality of upstanding tabs which extend between said convolutions, and rotary means for varying the height of the extremities of said tab above the upper surface of said burner or surface unit.

Other objects and advantages of the invention will be apparent to those skilled in the art upon a study of this specification and the accompanying drawings.

Referring to the drawings which are given by way of example to illustrate the invention.

Figure 1 is a plan view of one form of my new and improved guard;

Figure 2 is a cross sectional elevation of the guard taken on the line 2—2 of Figure 1;

Figure 3 is a perspective view of one of my new and improved guard elements showing its relation to the inner and outer rings;

Figure 4 is a perspective view of the guard elements shown in Figure 3 before the same has been pressed into rectangular form and attached to the inner and outer rings;

Figure 5 is an enlarged fragmentary view of the metal part of my guard showing the cut away portions for reducing the heat conductivity of the same from the bottom to the top thereof;

Figure 6 is an exploded view showing the elements which are contained within the rectangular body of each guard element;

Figure 7:
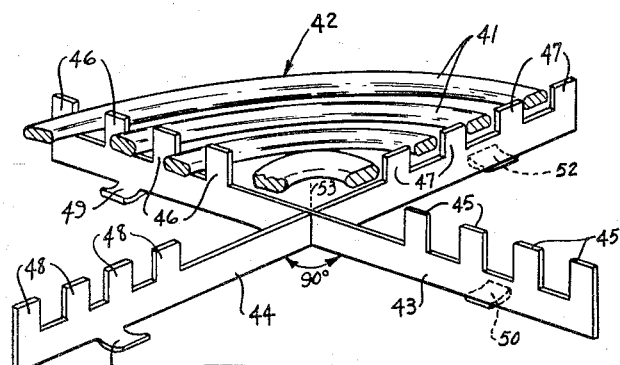
Figure 7 is a perspective view of a modified form of guard which is generally in the form of a cross with upright tabs or tongues which extend between the convolutions of the heating coil.

Referring first to Figures 1 and 2, the new and improved device includes a central ring 15 of a relatively light gauge heat resistant metal wire. Spaced apart from and concentric with the ring 15 is a larger ring 16 formed of similar heat resistant wire which is slightly larger in diameter than the wire of which the inner ring is formed. Positioned between the rings 15 and 16 are guard elements, which might be termed heat retardation elements 17, 18, 19 and 20. For the construction of these guard or heat retardation elements, reference is made to Figures 2 to 6 inclusive. The element 17, as may be seen in Figure 2 has a body 21, and an extension 22, formed integral therewith, has an end 23 which is rolled around in embracing relation with the wire ring 16. The body 21 has an extension 24 on its other end and this extension or strip has an end portion 25 which is rolled around in embracing relation with the inner ring 15.

The body 21 is formed integral with the extensions and it has a generally rectangular cross section which is formed by two integral side portions 26, 27. The side portion 26 has a series of perforations 28 formed therein and these perforations are preferably somewhat oval in shape with narrow webs of metal 29 therebetween. The edge 27 has similar perforations 30 formed therein with webs 31 therebetween. An imperforate portion 32 of the side 26 cooperates with an imperforate portion 33 of the side 21 to form an upper closure for the rectangular section after certain elements to be presently described have been positioned within the interior of the rectangle. The two imperforate portions 32 and 33 together present a flat surface or support. These features are shown in enlarged form in Figures 3 to 5 inclusive. For example, Figures 3 and 4 are enlarged perspective views showing the hollow rectangle, and the elements to be presently described in detail are grouped within said rectangle and generally designated by the numeral 34, Figure 4 showing the grouped elements being placed within the partially opened rectangle. Figure 3 shows the grouped elements properly positioned and positively clamped in the hollow rectangular body. Figure 5 is an enlarged fragmentary view showing details of the rectangular section, the element group 34 having been omitted for the sake of clarity.

Referring now to Figure 6, I show an exploded view of one example of a combination of elements which operate efficiently to reduce the conduction of heat from an electric heat unit to a glass or porcelain enamel cooking vessel. The lower element 35 is a rectangular strip of asbestos that rests on the inner bottom surface of the rectangle. Positioned upon the asbestos is a comparatively thin strip 36 of mica, and positioned upon the mica is an aluminum foil strip 37 and a second like strip 39 with a wire grid separator 38 therebetween. Atop the foil strip 39 is a second mica strip 40.

The above elements, preferably immovably secured together, are placed in the open channel such as that shown in Figure 4, and when properly positioned therein so that this assembly coincides with the lengths of the portions 32 and 33 the latter are forced downwardly to enclose the group 34, and firmly secure the same therein, thereby leaving the upper surface formed by the portions 32 and 33 as a flat supporting surface for the cooking vessel.

Operation

The surface units on modern electric ranges, as pointed out above, are too hot for use with glass or enamelware utensils except when these units are used within the low temperature ranges. In the higher ranges the temperatures reach as high as 1650° F. so that the cooking utensil should not rest directly on the surface unit.

The areas of direct contact between the utensil and the surface heat units are usually small and unevenly distributed, due to slight irregularities in both the utensil and the surface unit.

Utensils formed of glass, of which the Pyrex type is typical, are usually made of a boro-silicate glass which softens at temperatures between 1200° and 1300° F. Where such vessels are in direct contact with the surface of the heating element at high temperatures, very high stresses are set up in the molecular structure.

A similar problem obtains with enamelware utensils because the fusing temperature of the frit which formed the enamel coating is within the range 1600° to 1700° F., and therefore leaves no factor of safety whatever.

Now from the above description of my device, it will be readily appreciated that the contact temperature between the surface unit and the cooking vessel is greatly reduced with no appreciable loss in cooking heat. Therefore glass and enamelware utensils may be used on my device with efficiency and yet without damage to the utensil.

Referring to the heat retardation or guard element 17 in Figure 3, it will be seen that the surface, which lies between the portion 22 and the portion 24, is in contact with the surface unit of the electric range, and its temperature will be substantially the same as that of the surface unit. The strip of fiber asbestos 35, in contact with the lower surface, retards both the radiant heat and the conduction of heat. There is a thin mica strip 36 on top of the asbestos, and atop the thin mica strip is a thin strip 37 of aluminum foil which reflects some of the radiant heat which passes through the asbestos strip. The wire grid 38 which rests upon the aluminum foil is somewhat zig-zag in form, and thereby provides a series of air pockets which communicate with the perforations 28 on one side, and 30 on the opposite side of the rectangular structure 17, 18, 19 and 20. These air pockets serve to further retard the conduction of heat and finally the top surface 32, 33 of the heat retardation or safety element which serves as a support for the utensil.

Also, the perforations 28, 30 appreciably reduce the conduction of heat from the bottom surface to the top surface through the edges 26, 27 in a ratio predicated on the ratio of the sides of the perforations 28, 30 with respect to the webs 29 therebetween. Since the perforations are many times the cross-section of area of the webs, the reduction of the heat conducted through the metal is very substantially reduced.

Now with the vessel resting on the surface unit, and assuming that the contents of the vessel have a temperature in the vicinity of boiling water (212° F.), a temperature differential between the upper and the lower surfaces of the elements 17, 18, 19 and 20 is created. Heat is absorbed from the upper surfaces 32, 33 at a faster rate than such surfaces receive heat from the lower surface of the heat retarding element, due to the retardation of the elements within the insert 34. Also, the reduction of the conduction of heat through the perforated areas reduces the conduction of heat to the cooking vessel through the metal, and insures that the vessel obtains most of its heat from convection, and radiation, and a minimum by conduction.

Another feature of my device is that since the heat retardation elements 17, 18, 19 and 20 are substantially rectangular in cross-section, the upper surfaces of these elements upon which the vessel rests are approximately parallel to the bottom surface of the vessel, and thus the entire upper surface of the elements is in contact with or close proximity to the bottom of the vessel, thereby allowing the latter to absorb heat from the upper surface of said elements at a faster rate than said upper surface of the elements can acquire heat, due to the obstructed heat paths provided in each of said elements. Thus a substantial temperature differential is created between the upper surfaces of the heat retardation elements which are in contact with the vessel, and the lower surfaces of the elements which are in contact with the surface heating unit of the range.

The cooler the vessel and its contents (when first put on the heating unit), the greater the temperature drop in the heat retardation elements, and thus the lessening of the contrast between the cool vessel and the surface upon which it rests. Thus the portions of the utensil or vessel in contact with the retardation elements are subjected to safe temperatures, and yet the cooking speed is not noticeably affected.

Existing wire grids now on the market, which are supposed to protect glass and enamelware cooking vessels, get much hotter even though some models are made with one series superimposed upon another. In such devices the wire, being circular in cross-section, does not present sufficient surface to the vessel to allow substantial heat absorption. This is due to the fact that with wires of round cross-section the contact between such wire and the vessel is a "line" contact. I might also point out that where such wires are used, they acquire heat from the heat element in three ways: (1) by conduction; (2) by radiation; and (3) by convection. Also, such wire grids, particularly the two-stage type, are unstable and shaky, and consequently do not provide a firm support for the cooking vessel. Furthermore, such devices do not have any means for keeping the grid centered on the heat element, and many times they slide off the element during normal usage.

The above can not happen with my device because the outer ring 16, as will be noted from Figure 2, is disposed on a plane which extends substantially below the lower surfaces of the heat retardation elements 17, 18, 19 and 20, and consequently serves as a guard to prevent the movement of the device to any appreciable extent.

Figure 8:
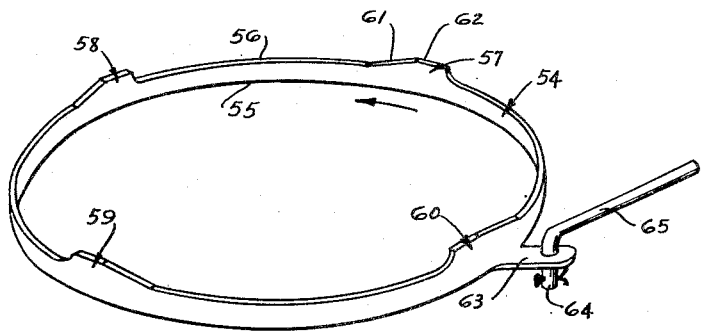
Figure 8 is a perspective view of a cam ring and means for moving the same in order to raise or lower the tab ends of the cross relative to the upper surfaces of the heating coils.
Figure 9:
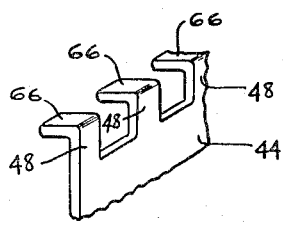
Figure 9 is a fragmentary perspective view showing tabs having the ends bent through an angle of approximately 90° so as to present flat surface to be contacted by the glass vessel.

Referring to Figures 7 and 8, I show a modified arrangement wherein the convolutions 41 of the surface heating unit 42 for an electric range have an improved cooking vessel raising arrangement. Positioned below the heating element 42 are bar members 43 and 44 which cross each other, and which are preferably disposed 90° apart. Formed integral with the member 43 is a series of tongues 45 adjacent to one end thereof, and the second series of tongues 46 adjacent to the other end thereof. As may be seen in Figure 7, the tongues extend upwardly between the convolutions 41 of the heating element, and means is provided for raising or lowering them as will presently be described. The member 44 has a like series of tongues 47 adjacent to one end thereof, and the second series of tongues 48 adjacent to the other end thereof.

Preferably formed integral with the member 43 is a tab 49 adjacent to one end thereof, and a second tab 50 adjacent to the other end thereof. Like tabs 51 and 52 are provided on the other member 44, and all of these tabs are substantially equi-distant from a center line 53 extending through the members 43 and 44 where they cross each other.

On Figure 8 an annular ring 54 has its lower surface 55 lying on a substantially horizontal plane, and its upper edge 56 is substantially equi-distant therefrom except at points where cam members 57, 58, 59 and 60 are formed integral therewith to perform a function which will presently be described. Each one of the cams has an inclined surface 61 which rises from the level of the surface 56 to an apex 62. This is shown and described in connection with the cam 57, and since all four of the cams are identical I believe a detailed description of one of them is sufficient for an understanding of all of them.

The ring 54 has a radial lug 63 formed integral therewith and extending beyond the outer diameter thereof. The lug 63 has a vertical hole therein through which one end 64 of a pull rod 65 extends.

The ring 54 is positioned below the cross members 43 and 44 so that the latter rest upon the surface 56 of the ring and at points adjacent to the inclines 61 which lead up to the several cams 57, 58, 59 and 60, and the end of the pull rod 65 may be connected to a convenient handle (not shown) so that the user, while moving the handle, may cause the cams to raise the members 43 and 44, and cause the tongues 45, 46, 47 and 48 to rise to points where the upper ends are substantially above the level of the upper surface of the heating element 42. Then a glass cooking vessel or a porcelain enamel one may be positioned on the upper ends of the tongues instead of in contact with the surfaces of the heating element 42. This will insure that neither the glass vessels nor the porcelain enamel vessels can possibly become damaged by conductive heating from the element 42.

In Figure 8 I show a modification wherein the tongues of Figure 7 have their upper portions 66 bent in a manner to place their upper surfaces substantially parallel to the heating element 42 so as to present flat surfaces of substantial area for the cooking vessel to rest upon.

Instead of a pull rod, such as that shown at 65 in Figure 8, I may provide other means for actuating the cam ring, for example, (a) by means of a Bowden wire, (b) by means of linkages, (c) by other equivalent means such as racks and pinions, solenoids, etc.

Figure 10:
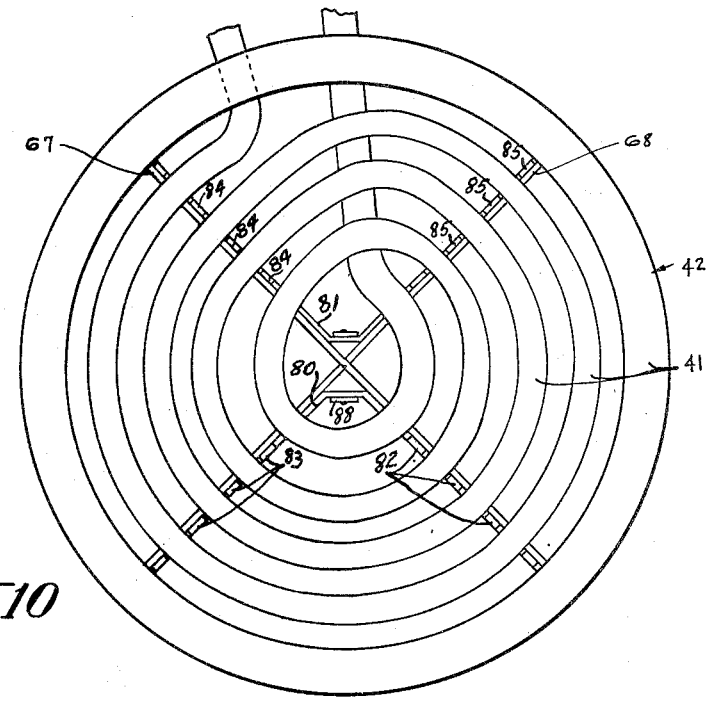
Figure 10 is a plan view showing a modified arrangement of the cross member carrying the upright tabs.
Figure 11:
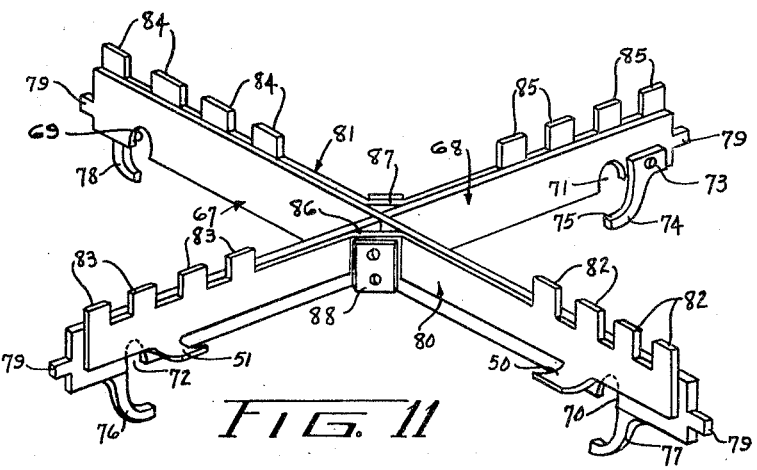
Figure 11 is a perspective view showing the cross members carrying the upright tongue and also carrying lugs for supporting the cam ring for raising and lowering the tongues; and, Figure 12 is a perspective view of a modification of the arrangement shown in Figure 11.

Referring now to Figures 10 and 11, a modified form of the arrangement shown in Figure 7 is shown. Cross members 67 and 68 are plain except for notches 69, 70, 71 and 72. Secured to the cross member 68 by means of dowels (not shown) and screw means 73 is a lug 74 which has its extremity 75 substantially horizontal to form a bearing support for a cam ring, such as the cam ring 54 shown in Figure 8. On the other end of the bar 68 is a second lug 76 which is detachably secured thereto in the same manner. Similar lugs 77 and 78 are provided on the bar member 67. On the extremities of the bar members 67 and 68 are tabs 79 which may be employed for mounting the crossed members 67, 68 below a surface heater 42 such as that shown in Figure 10.

Figure 12:
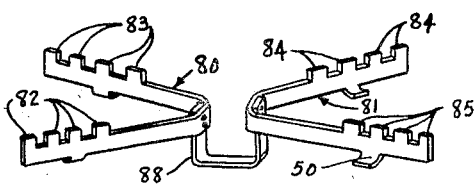

In other words, the cross bar members 67 and 68 are to take the place of those normally used to support the heating element in existing stoves. Reciprocally movable in contact with the vertical surfaces of the cross members is an L-shaped member 80 and a second L-shaped member 81. The member 80 has a series of tongues 82 formed integral therewith, and the upper extremities of these tongues form supports for the vessel when the element 80 has been slid to its upper position. The member 80 also has a like series of vertical tongues 83, the upper extremities of which also support the cooking vessel when the element is in its raised position. The portion of the element 80 carrying the tongues 82 is in contact with the member 67 between the center and the end which carries the lug 77, while the portion carrying the tongues 83 slides on the surface of the portion of the bar 68 between the center and the end carrying the lug 76. Likewise, the member 81 has a series of like tongues 84 adjacent to one end thereof, and a second series of tongues 85 adjacent to the other end thereof. The element 81 slidably engages the vertical surfaces of the cross member 68 between the center and the lug 74, and slides on the cross member 80 between the center and the lug 78. The extending portions of the element 80 join a central flat portion 86, and by the same token the extending portions of the member 81 join a flat portion 87. Now, in order to provide a substantially rigid structure, a U-shaped yoke member 88 is riveted or otherwise positively secured to the flat portions 86 and 87 so that the two members 80 and 81 are held in slidable engagement with the vertical faces of the cross members 67 and 68. The cross members 67 and 68 are also provided with horizontal tabs 50 and 51 and other tabs not visible in Figure 11, corresponding to the tabs 49 and 52 shown in Figure 7. The rigid structure formed of the yoke member 88 and the elements 80 and 81 is shown in perspective in Figure 12.

*Operation of the modification shown in Figures 7, 8, 10 and 11*

This form of the device is devised to be built into a modern electric range instead of being used as an attachment. The cam ring 54 is positioned on a suitable support in the range beneath the heating element, such as that shown at 42, and by means of a control element, such as the pull rod 65 or any other suitable means, the cam ring may be rotated in a counter-clockwise direction as viewed in Figure 8 to cause the cams 57, 58, 59 and 60 to engage the tabs 49, 52, 50 and 51 respectively, and raise the elements 43 and 44 carrying the tabs 45, 46, 47 and 48. Now with these tabs so positioned that their extremities are above the level of the surface of the heating element 42, glass or porcelain enamel vessels may be positioned on the extremities of these tongues out of contact with the surface of the element 42, and consequently out of the range where melting temperatures would be encountered.

In the arrangement shown in Figures 10 and 11, the cross members 67 and 68 form a support for the convolutions 41 of the element 42, and also form (on their vertical side surfaces) bearings upon which the fabricated unitary structure 80, 81, 88 may reciprocate while being raised from an upper to a lower position. The cross members 67 and 68 also carry lugs which support the cam ring 54 in the proper relation to the elevating tabs 50, 51, etc., so that as the cam ring is rotated the structure 80, 81, 88 is moved upwardly to bring the extremities of the tongues 82, 83, 84 and 85 substantially above the level of the upper surfaces of the convolutions 41 of the heating element 42 so that any glass or porcelain enamel vessel which might otherwise be damaged by the heat is out of danger.

From the above it will be apparent that one of my modifications is to be used as an attachment for existing electric ranges, and the other is devised to be built into modern electric ranges at the time they are being manufactured. In either case adequate protection is provided for glass and porcelain enamel cooking utensils.

The examples shown and described herein are for the purposes of illustrating the invention, but are not to be limitative, as many changes may be made in the arrangements shown and described within the scope of the appended claims.

I claim:

1. In a guard for protecting cooking vessels from the higher temperatures of the heating element of electric ranges, a hollow metallic body having a lower surface adapted to be placed in contact with the upper surface of said element and having an upper surface to be contacted by the bottom of one of said vessels, and means comprised of; an upper insulating strip, strips of metallic foil with a grid separating them, and lower strips of insulation resting on said lower surface; within said body for substantially reducing the conductivity of heat from said lower surface to said upper surface.

2. In a guard for protecting cooking vessels from the higher temperatures of the heating element of electric ranges, a hollow metallic body of rectangular cross-section and having a lower surface adapted to be placed in contact with the upper surface of said element and having an upper surface to be contacted by the bottom of one of said vessels, a series of perforations in at least one of the sides of said body between said surfaces for reducing the conductivity of heat from said lower to said upper surface, and other means comprised of; an upper insulating strip, metallic foil strips with a grid separating them, and lower strips of insulation contacting said lower surface; within said body for additionally reducing the conductivity of heat from said lower surface to said upper surface.

3. In a guard for protecting cooking vessels from the higher temperatures of the heating element of electric ranges, a plurality of radially disposed hollow metallic bodies of rectangular cross-section and having a bottom wall the lower surface of which is adapted to be placed in contact with the upper surface of said element and having an upper wall the top surface of which is to be contacted by the bottom of said vessel, a series of perforations in at least one of the sides of each of said body between said surfaces for reducing the conductivity of heat from said lower to said upper surface, and a series of elements stacked upon one another, within said body and comprising an upper insulating strip below and contacting said upper wall, strips of metallic foil with a grid separating them and insulating strips between one of said strips of foil and the upper surface of said bottom wall; said elements co-operating with each other for additionally discouraging the delivery of heat from said lower surface to said upper surface.

4. In a guard for cooking vessels adapted to be placed upon the upper surface of an electric heating element for supporting a cooking vessel thereon, an annulus adapted to embrace the outer perimeter of said heating element, an inner annulus substantially concentric with first annulus, and a plurality of guard elements spaced apart from each other and extending radially between said annuli, each guard element being comprised of: a body having a lower surface adapted to contact said heating element, an upper surface spaced apart therefrom and adapted to be contacted by said cooking vessels; and stratified insulating means, reflecting means and radiating means disposed between said surfaces in the order set forth for substantially reducing the conduction of heat from one of said surfaces to the other.

5. In a guard for cooking vessels adapted to be placed upon the upper surface of an electric heating element for supporting a cooking vessel thereon, an outer annular ring slightly larger than and adapted to embrace the outer perimeter of said heating element, a substantially smaller inner annular ring substantially concentric with first annulus, and a plurality of guard elements spaced apart from each other and extending radially between said rings, each guard element being comprised of a hollow metallic rectangular body blanked and formed from a single piece of metal and having a lower surface adapted to contact said heating element, an upper surface spaced apart therefrom and adapted to be contacted by said cooking vessels, and an upper insulating strip, a pair of metallic foil strips with a wire grid separating them and lower strips of insulation embraced and enclosed by said rectangular body for discouraging and substantially reducing the conduction of heat from one of said surfaces to the other.

References Cited in the file of this patent
UNITED STATES PATENTS

| | | |
|---|---|---|
| 913,567 | Schirra | Feb. 23, 1909 |
| 1,146,330 | Hoock | July 13, 1915 |
| 1,164,066 | Burleson et al. | Dec. 14, 1915 |
| 1,716,329 | Simpson | June 4, 1929 |
| 1,731,769 | Detwiler | Oct. 15, 1929 |
| 1,864,715 | Detwiler | June 28, 1932 |
| 2,090,122 | Hicks | Aug. 17, 1937 |

FOREIGN PATENTS

| | | |
|---|---|---|
| 437,923 | Great Britain | Nov. 7, 1935 |